May 7, 1946.　　　B. COTTER ET AL　　　2,399,722
MATERIAL HANDLING DEVICE
Filed Jan. 6, 1944　　　7 Sheets-Sheet 1

Fig. 1

BART COTTER
LEONARD H. KLAASEN
THOMAS P. ARCHER
INVENTORS

BY
ATTORNEYS

May 7, 1946.  B. COTTER ET AL  2,399,722
MATERIAL HANDLING DEVICE
Filed Jan. 6, 1944   7 Sheets-Sheet 3

BART COTTER
LEONARD H. KLAASEN
THOMAS P. ARCHER
INVENTORS

BY
Barnes, Kisselle, Laughlin & Raisch
ATTORNEYS

Fig. 5

BART COTTER
LEONARD H. KLAASEN
THOMAS P. ARCHER
INVENTORS

May 7, 1946.   B. COTTER ET AL   2,399,722
MATERIAL HANDLING DEVICE
Filed Jan. 6, 1944   7 Sheets-Sheet 7

BART COTTER
LEONARD H. KLAASEN
THOMAS P. ARCHER
INVENTORS

BY
Barnes, Kisselle, Laughlin & Raisch
ATTORNEYS

Patented May 7, 1946

2,399,722

UNITED STATES PATENT OFFICE 2,399,722

MATERIAL HANDLING DEVICE

Bart Cotter, Detroit, Leonard H. Klaasen, Grand Rapids, and Thomas P. Archer, Detroit, Mich., assignors to General Motors Corporation, Detroit, Mich., a corporation of Delaware Application January 6, 1944, Serial No. 517,216

4 Claims. (Cl. 214—130)

This invention relates to a material handling device for feeding material into a machine. In particular the invention relates to a material handling device for loading and ramming projectiles and powder cases into a gun.

It is the object of this invention to produce a material handling device which will feed the material into the machine efficiently and rapidly and thereby increase the speed of operation of the machine. In the particular application of the invention the increase in the speed of operation of the machine manifests itself in an increased rate of fire (projectiles discharged per minute) of the gun.

The invention also contemplates a material handling device which will reduce the likelihood or chances of injury to the men operating the machine and which will also appreciably reduce operator fatigue.

The invention also contemplates a material handling device which will feed the material into the machine or gun uniformly regardless of the angular position of the machine, or, specifically, regardless of the inclination of the barrel of the gun.

This material handling device is particularly adapted for loading and ramming powder cases and projectiles into a gun, but obviously is useful for handling other material and for loading such material into other machines than guns. The particular gun to which this material handling device has been applied forms no part of the invention claimed herein and therefore the gun is not shown in detail.

The gun barrel is mounted on parallel tracks 2 and 3 for recoil purposes and is provided at its rear end with a standard breech mechanism 4. The loading and ramming mechanism is mounted on top of the left hand track 2 and is positioned so that its weight is balanced fore and aft of the horizontal axis about which the gun may be elevated. The gun barrel, tracks and associated mechanisms are mounted upon a supporting base so that the gun can be rotated about a vertical axis and so that it can be elevated from horizontal through an angle of about 80°. Since the loading and ramming mechanism, that is, the material handling device, is mounted on the left hand track it rotates with and swings with the gun from horizontal through an angle of about 80° through which angle the gun may be elevated.

The power unit for operating the material handling device comprises an electric motor 5, flywheel 6 mounted on the motor shaft, a speed changer 7, a flexible coupling or universal joint 8 running at reduced speed and connecting the speed changer to a gear box or reduction gear assembly 9, a stub shaft 10, and a flexible coupling 11 connecting the lower end of the gear assembly 9 with a clutch 12 of the one-revolution type used ordinarily on punch presses. The specific structure of clutch 12 forms no part of the present invention and therefore is not shown or described specifically. Clutch 12 embodies a one-revolution, non-repeating feature and is shown in the patents to Munschauer 2,057,905 and Hahnemann 2,011,629. Clutch 12 is of the type which makes one complete revolution and then is automatically disengaged.

The electric motor 5 is arranged to receive current from a portable generator (not shown). The motor is supported on the housing of the speed changer 7. The speed changer 7 and the reduction gear box 9 are secured by bolts to the left-hand track of the gun.

The clutch 12 drives the main shaft 13 which is supported adjacent its opposite ends on the roller bearings 14 and 15. Roller bearings 14 and 15 in turn are mounted upon, or supported in the main frame 16 of the material handling device. A drum 17 is mounted concentrically upon shaft 13 and is keyed to shaft 13 by keys 18 so that the drum 17 and shaft 13 rotate in unison.

Figure 2:
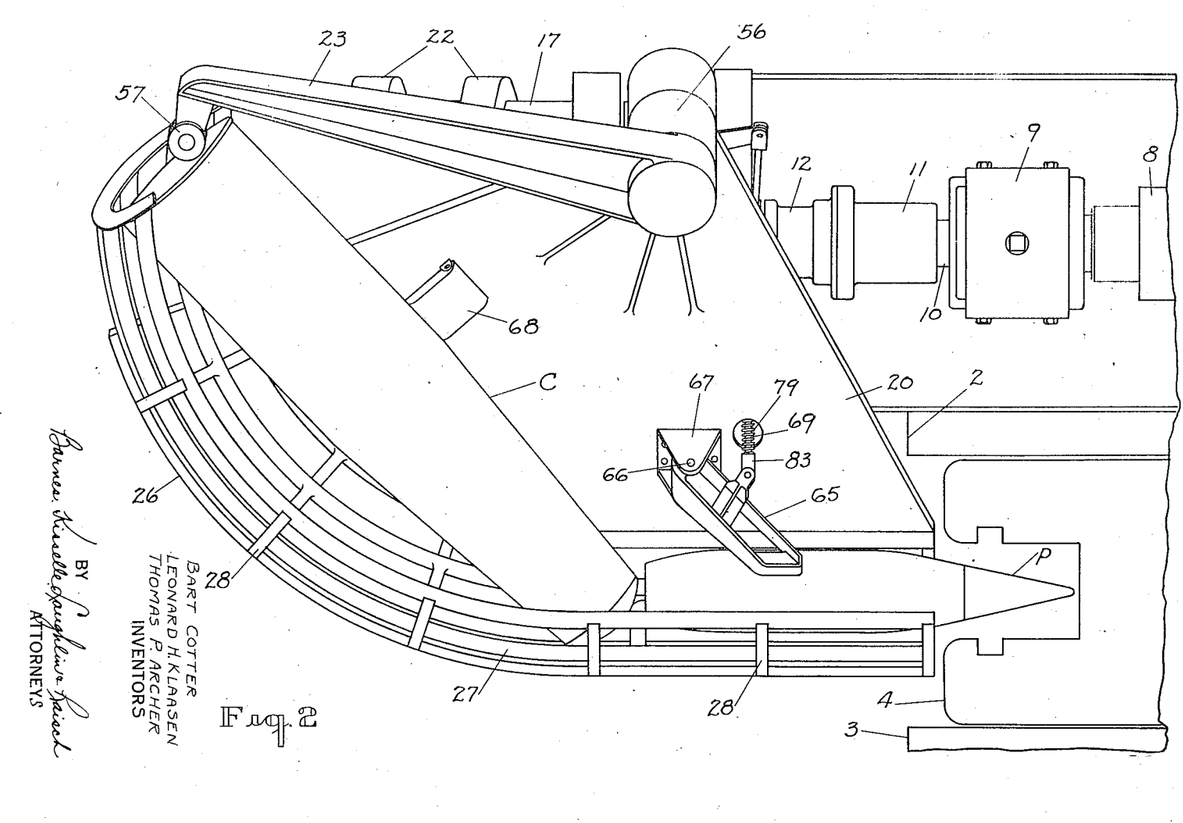
Fig. 2 is an elevation showing the material handling device with the rammer tray in the line of bore position ready to ram the projectile and cartridge or powder case into the breech of the gun. This view is taken on the opposite side of the material handling device from the view shown in Fig. 1.
Figure 3:
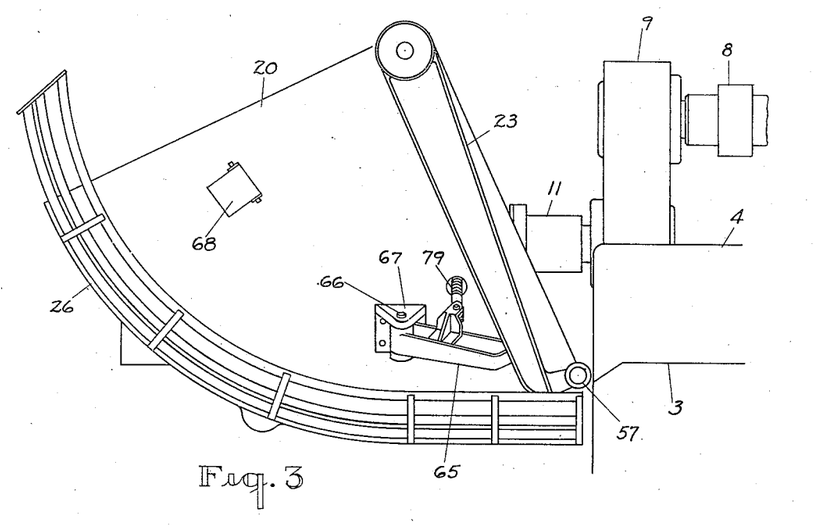
Fig. 3 is a view similar to Fig. 1 but showing the material handling device after the cartridge and projectile have been discharged from the tray and rammed into the breech of the gun.
Figure 4:
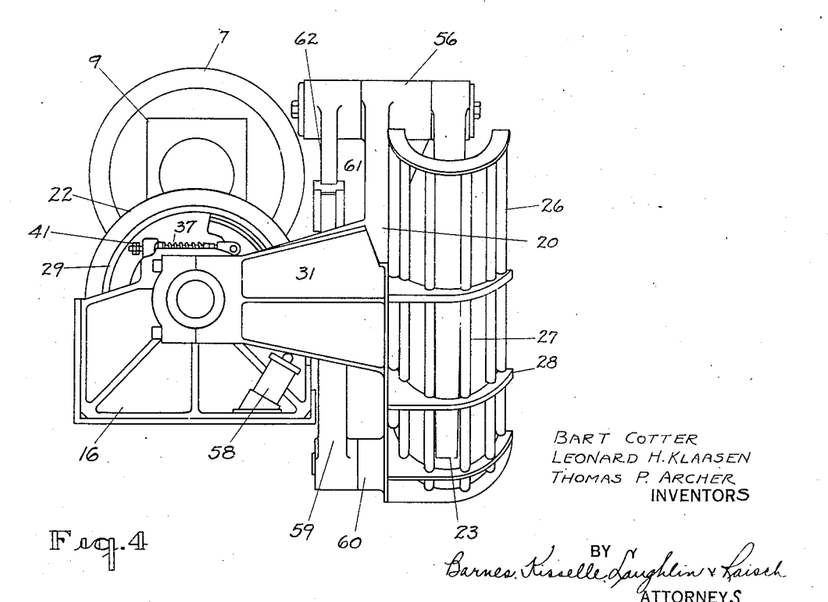
Fig. 4 is an end elevation of the material handling device as viewed from the left hand side of Fig. 3.
Figure 9:
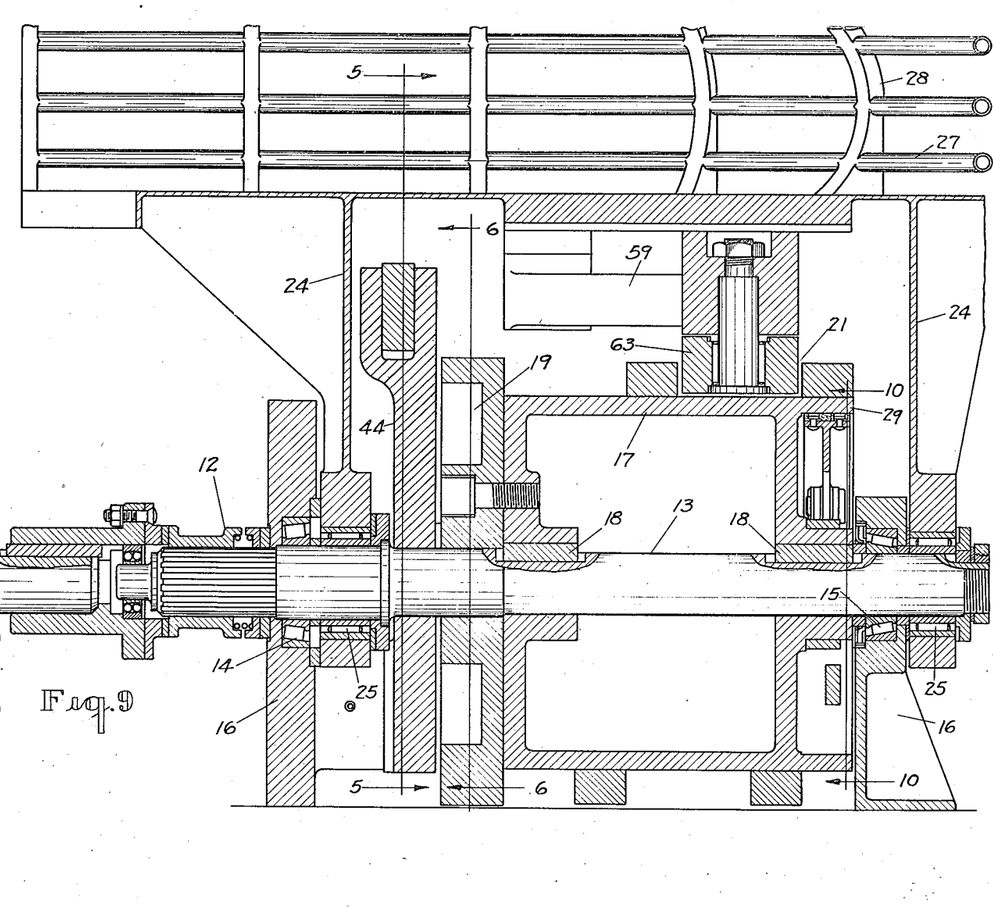
Fig. 9 is a longitudinal section along the line 9—9 of Fig. 1.

The drum 17 is provided with two cam tracks which control the principal motions of the material handling device or rammer. The first of these cam tracks or grooves is located on the left-hand end of the drum (Fig. 9) nearest the clutch 12. This cam track or groove is designated 19. Cam track 19 controls the tilting movement of the tray 20 as described below. The cylindrical portion of the cam drum 17 is also provided on its exterior surface with a cam track 21 defined by the raised parallel cam members 22. Cam 21 controls the movement of the arm 23 which rams the projectile P and cartridge C (sometimes called the powder case) into the gun barrel. The tray 20 is arranged to tilt or swing upwardly and downwardly and to this end is mounted upon a pair of legs 24 and the lower ends of legs 24 are journalled upon shaft 13 by means of roller bearings 25. Thus, tray 20 is free to rotate or tilt relatively about shaft 13. Tray 20, Fig. 2, is provided with a curved or arcuate chute, generally designated 26, along its outer edge.

Chute 26 is comprised of a plurality of tubes 27 held in parallel relation by a plurality of braces 28 which are welded or otherwise fixed to the tray and tubes 27. The end 29 of cam drum 17 opposite cam track 19 forms a brake drum having a braking surface 30.

Figure 10:
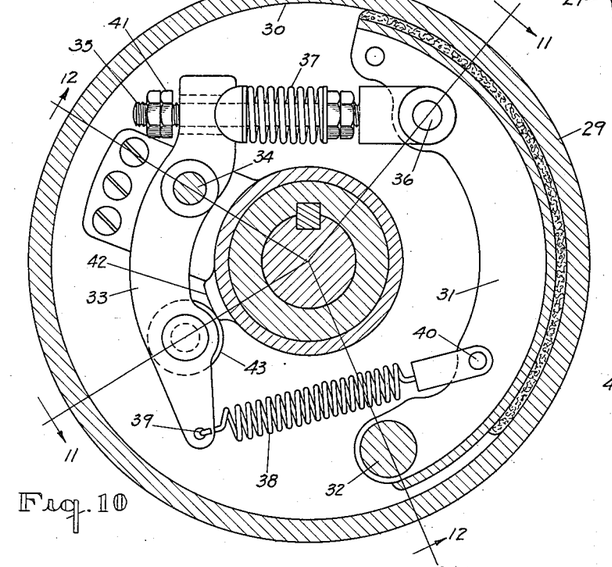
Fig. 10 is a section along the line 10—10 of Fig. 9 showing the brake and drum cam in their elevation.
Figure 11:
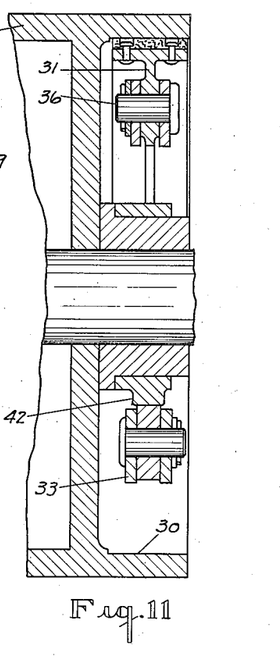
Figs. 11 and 12 are sections along the lines 11—11 and 12—12 of Fig. 10.
Figure 12:
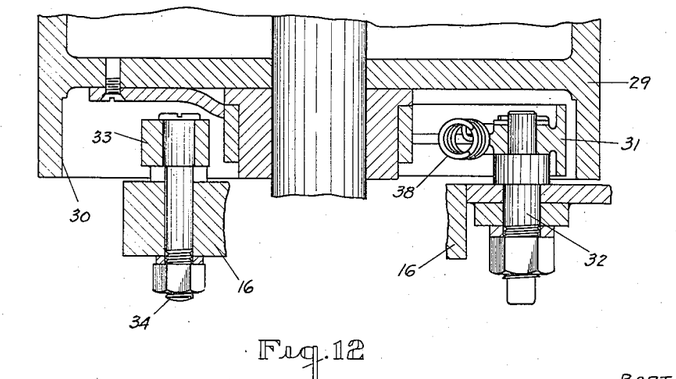

Figs. 10, 11 and 12 show the details of the brake for stopping the drum at the end of each cycle. A brake shoe 31 is pivoted by means of pin 32 upon a stationary part of the main frame 16. An actuating lever 33 is pivotally mounted by means of pin 34 also on the stationary part of main frame 16. Lever 33 is connected to shoe 31 by link 35. Link 35 is pivoted at one end to shoe 31 as at 36 and the other end of link 35 has a loose sliding fit in the upper end of actuating lever 33. A compression spring 37 is mounted over link 35 and acts between the upper ends of lever 33 and shoe 31 tending to spread the same. A tension coil spring 38 is mounted between the lower end of lever 33 and brake shoe 31. One end of coil spring 38 is secured to the lower end of lever 33 as at 39 and the other end is secured to the brake shoe 31 as at 40. Thus, coil spring 38 urges the lower end of lever 33 toward shoe 31 causing the upper end of the lever 33 to act through nuts 41 and link 35 to exert a pull on brake shoe 31 and thereby keep the shoe 31 out of braking engagement with braking surface 30. As shown in Fig. 10, brake shoe 31 is in braking engagement with drum 29.

When the loader and rammer mechanism is at rest, that is, in the loading position which it takes at the end of each cycle, a cam 42 fixed on the hub of drum 17 and arranged to rotate therewith, strikes roller 43 on the lower end of lever 33 thereby swinging lever 33 clockwise (Fig. 10) which causes the upper end of the lever to act through spring 37 against the shoe 31 thereby causing brake shoe 31 to engage braking face 30 and thereby brake or hold the drum in loading or rest position.

Figure 5:
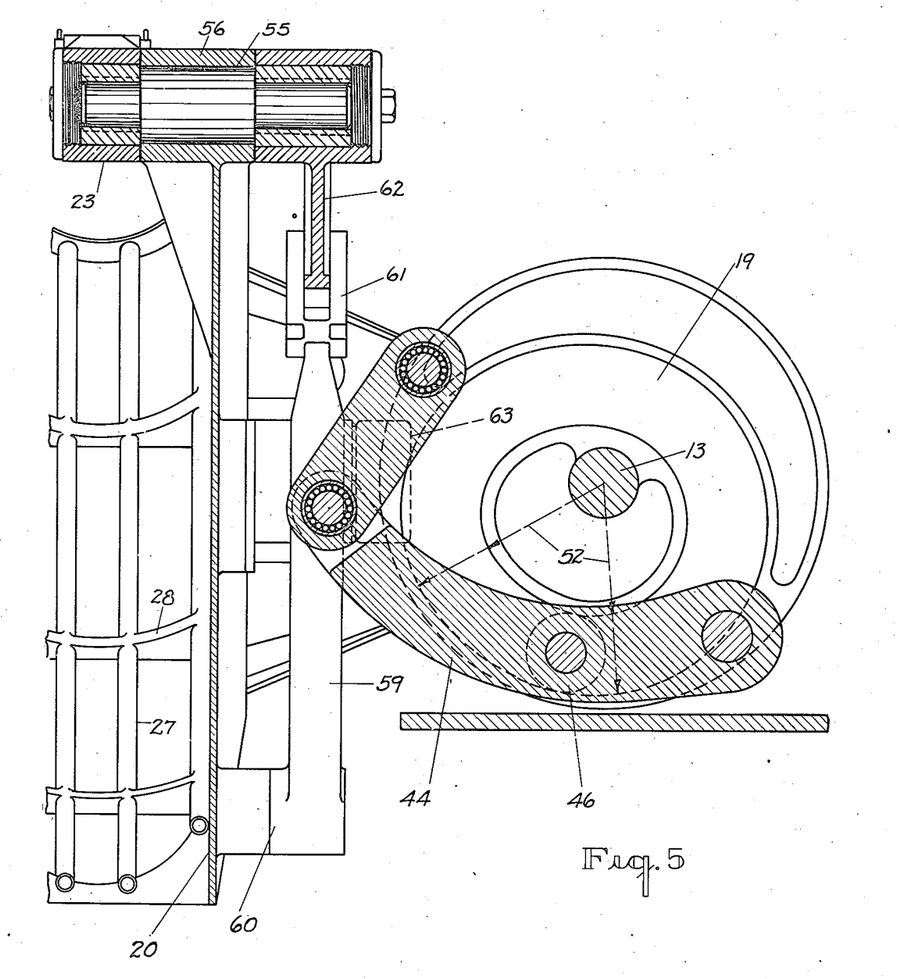
Fig. 5 is a section along the line 5—5 of Figs. 1 and 9 showing the tray in the line of bore position.
Figures 6, 7, 8:
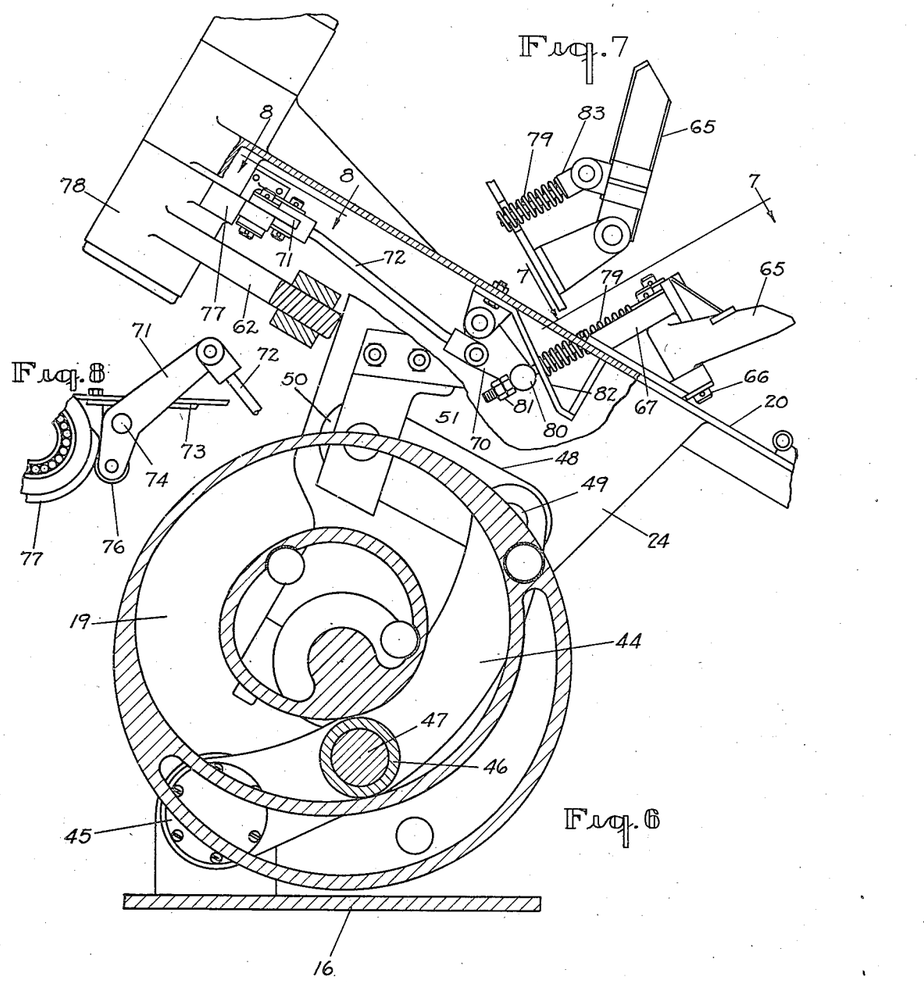
Fig. 6 is a section along the line 6—6 of Figs. 1 and 9 but showing a position of the tray and its operating cam at the end of the material handling cycle with the tray raised and in position to receive the projectile and cartridge.
Figs. 7 and 8 are sections along the lines 7—7 and 8—8 of Fig. 6.

Tray 20 is rotated or pivoted from the loading position (Fig. 6, the position in which the cartridge and projectile are loaded into the tray) to the ramming position (Figs. 2–5) by cam track 19, lever 44 pivoted at its lower end to main frame 16 as at 45, roller 46 which is journaled on pin 47 mounted on arm 44 and traveling in cam-way 19 and link 48 pivotally connected at one end as at 49 to the upper end of arm 44 and pivotally connected at its other end as at 50 to bracket 51 bolted to the under side of tray 20. As the cam drum 17 rotates through the single revolution permitted by clutch 12, the arm 44 is oscillated thereby causing the tray to drop from loading to ramming position. The tray dwells in the ramming position a short time (Fig. 5) due to the fact that the cam track has a portion located between arrows 52 which is approximately concentric with the center of rotation of the drum; namely, shaft 13, whereupon further rotation of the cam drum 17 causes the cam track 19 to raise the tray to loading position (Fig. 6).

For discharging the projectile and cartridge from the tray and for ramming the same into the breech of the gun there is provided a rammer arm 23 which is keyed to shaft 55 which is journalled in journal bearing 56 mounted on or integrally formed or cast with tray 20. The free end of arm 23 is provided with spaced rollers 57 which bear against the end of the powder case C. The rollers bridge the percussion cap. After the tray 20 has been lowered to ramming position, arm 23 swings downwardly with an accelerated motion to ram the projectile and powder case into the breech of the gun. Dash pot 58 (Fig. 4) mounted on the main frame acts as a partial shock absorber for cushioning the tray at the end of its downward travel to ramming position.

Figure 1:
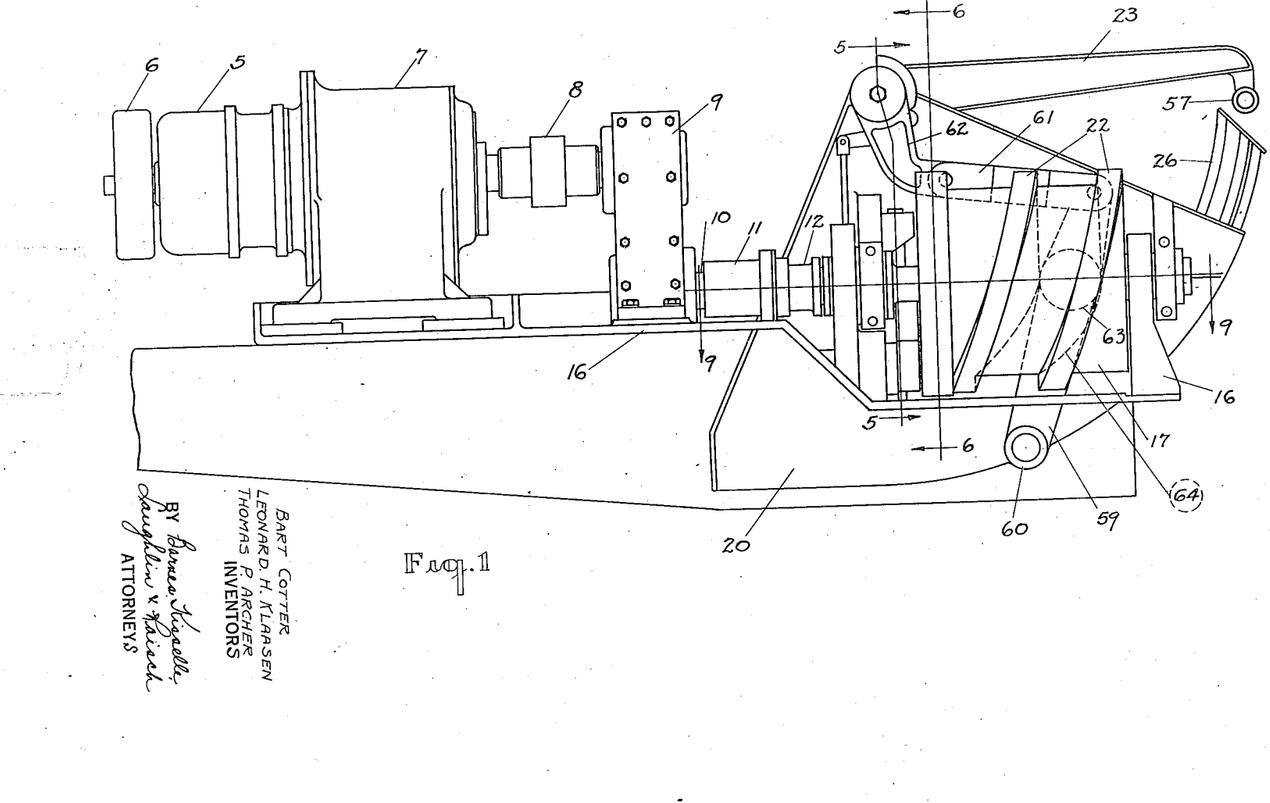
Fig. 1 is a side elevation showing the material handling device looking at the rammer tray from the cam side.

The mechanism for controlling the swinging or operation of the rammer arm 23 is as follows: Arm 59 (Fig. 5) is pivoted at one end to the under side of the tray as at 60. The other end of arm 59 is pivotally connected by means of a link 61 with a crank arm 62 keyed on shaft 55 (Figs. 1 and 5). Arm 59 carries a roller 63 which rides in cam-way or track 21 on the periphery or outside of drum 17. Thus, during the rotation of the cam drum 17 arm 59 is given an oscillatory motion which is accelerated by a steep portion of the cam track or way as at 64 (Fig. 1). This accelerated movement on the part of arm 59 is transmitted through link 61, crank 62, shaft 55 to ramming arm 23, thereby causing the ramming arm to throw the projectile or powder case into the breech of the gun. The return stroke of arm 23 is coincident with the tray 20 to loading position in order to shorten the cycle.

It is essential to insure efficient and speedy operation of the material handling device to immediately and quickly withdraw the tray upwardly after the ramming has been completed in order to provide clearance for the recoil of the gun barrel. This quick upward movement of the tray is effected by the design or configuration of cam track 19. By referring to Fig. 5 it will be seen that after the roller 46 travels along the concentric portion of the cam-way 19, that the roller 46 reaches a part of the cam-way which has an abrupt eccentricity that causes roller 46, arm 44 and link 48 to quickly and abruptly raise the tray to loading position and out of the way of the gun barrel on recoil. This abrupt retraction of the tray from ramming to loading position can be observed by comparing Figs. 5 and 6 of the drawings.

A latch device is provided for holding the projectile in the chute 26 and to prevent the same from being thrown out of the chute when the tray is lowered. This latching device comprises a latch member 65 pivoted on pin 66 carried by bracket 67 fixed to the upper side of tray 20. Pivot pin 66 is arranged at an angle to the top of tray 20 (see Fig. 6) and swings counterclockwise (Fig. 2) to released position. Latch 65 is shown in latching position (Figs. 2 and 6) and in released position (Fig. 7). In latched position the latch 65 bears down upon the projectile P and holds it in the chute 26.

Latch 65 is arranged to be retracted after tray 20 is lowered and as the ramming arm 23 begins its downward travel so that latch 65 will be out of the way or clear of the powder case C. To this end a link 69 pivotally connects latch 65 to a bell crank lever 70 which in turn is pivotally connected to one end of a rocker arm 71 by a link 72 (Figs. 6 and 8). Rocker arm 71 is pivotally mounted on bracket 73 by pin 74. Bracket 73 is bolted or otherwise affixed to the under side of tray 20. The opposite end of arm 71 rotatably supports a roller 76 which is in position to be engaged by a cam 77 located on the hub 78 of arm 62. As the rammer arm 23 begins its downward sweep, cam 77 rides under roller 76 thereby pivoting rocker arm 71 counterclockwise (Fig. 8) which through link 72, bell crank 70 and link 69 retracts latch 65 to provide clearance for the powder case. On the return stroke of the rammer arm the latch is again projected.

A coil spring 79 surrounds link 69 and link 69 has a pivotal slip joint connection 80 with bell crank 70 so that bell crank 70, acting against nuts 81 (Fig. 6) on link 69, can draw link 69 downwardly to retract latch 65, as occurs when roller 76 rides onto cam 77. However, when roller 76 rides off of cam 77 it is compression spring 79 acting between bracket 82 affixed to the under side of tray 20 and the enlarged end 83 of link 69 which projects the latch 65 to latching position. Thus, latch 65 is positively retracted by bell crank 70 but is spring projected by spring 79. This one-way drive connection allows latch 65 to be retracted by the projectile as it is dropped into the chute and into its ramming position, as shown in Fig. 2. Spring 79 then projects the latch 65 so that it overlies the projectile and holds the same in the tray.

A simple spring latch 68 is utilized to hold the powder case C in the chute. This spring latch 68 is depressed by the powder case as it is placed in the chute and then the spring latch 68 springs outwardly to retain the powder case against being thrown out of the chute as the tray is lowered. As the powder case moves down the chute during ramming, the powder case drops away from latch 68.

While the tray is in raised and loading position (Fig. 6), the projectile P and powder case C are manually positioned in chute 26 with the fuse pointed forward. Clutch 12 is now tripped to interengage clutch 12 for one revolution of shaft 13 and drum 17. The details of the clutch 12 and tripping mechanism are conventional and well-known and therefore not shown and described specifically. This type of clutch is commonly used on punch presses and is shown in the patents referred to above. Such clutches are conventionally controlled by a remote control lever which, through an articulated linkage, lifts the trip pin from the clutch sleeve and the clutch sleeve spring forces the clutch sleeve along the splined portion of the drum cam shaft into engagement with the clutch drive plate. Such clutch is provided with a non-repeat cam on the drum cam shaft, which non-repeat cam actuates a non-repeat lever which presses a pin against a non-repeat link and disengages it from the clutch control linkage. The trip pin then bears against the cam on the clutch sleeve and the cam action disengages the clutch after one complete revolution of the drum cam 17 and the plate cam 19.

The brake cam 42 sets the drum cam brake 31 when the revolution is almost complete. When the revolution is complete and the clutch disengaged, the braking action stops the drum cam 17. The action of plate cam 19 lowers tray 20 to ramming position, while it dwells the semi-fixed charge is rammed into the breech of the gun and then returns the tray to loading position and clear of the gun in recoil. While the plate cam 19 causes the tray to dwell in ramming position, the action of the drum cam 21 swings the rammer arm 23 forward, throwing the projectile and powder case into the breech of the gun and then, as the tray is returned to loading position, the action of the drum cam returns the arm to position for loading the next round. As the tray completes its return to loading or raised position (Fig. 6), the brake cam 42 sets the drum cam brake and when the revolution is complete and the clutch 12 disengaged, the braking action stops the cam drum 17.

It is evident from the above that the tray 20 with the curved chute is important because it enables both pieces of ammunition, that is, projectile P and cartridge C, to be loaded simultaneously and then rammed without interruption or without an intervening mechanical operation. This enables the maintenance of constant time between fuse setting and actual firing of the gun which is most important. Further, the curved tray is important as a space saver. When the gun is firing at high elevations, the space between the breech of the gun and the ground or gun platform is at a minimum. It is in this space that the loader and rammer mechanism must work. By the use of a curved tray less longitudinal space is taken up for the cartridge and projectile than would be the case if the tray were straight and arranged so that the cartridge and projectile were in longitudinal alignment.

Another important result flowing from the use of a curved tray is that a curved tray permits the use of a ramming arm, such as arm 23, operating on a fixed center which, with one uninterrupted stroke rams both the projectile and powder case into the breech.

We claim:

1. A material handling device adapted for feeding articles to a machine, comprising a pivoted tray swingable from article receiving position to article discharging position, a curved chute for said tray, said chute being curved lengthwise, an arm pivoted on said tray so that the free end of the arm travels in an arcuate path adjacent said chute, and means for swinging said arm from retracted position adjacent one end of said chute on its discharge stroke to a position adjacent the other end of said chute whereby the article is moved along said chute and discharged from the tray into the machine.

2. A material handling device adapted for feeding articles to a machine comprising a tray oscillatable through a cycle from article receiving position to article discharge position and return, article discharge means carried by said tray and actuatable through a cycle comprising an article discharge stroke and return stroke to retracted position, a shaft, a source of power, a one revolution, non-repeat clutch for connecting said shaft to said source of power, a drum fixed on said shaft having a cam track around its circumference and a cam track at one end, connections between the said cam tracks and the tray and article discharge means for driving each through its complete cycle of operation for each revolution of the drum, and a pair of arms pivotally supported at one end on the said shaft and connected to the tray at their other ends whereby the said tray is arranged to oscillate about said shaft as a center.

3. A material handling device adapted for feeding articles to a machine comprising a reciprocating tray tiltable through a cycle from article receiving position to article discharge position and return, an arm pivoted on said tray and arranged to swing across said tray for discharging the article while the tray is in discharge position, a latch for holding the article on the tray as the tray moves from article receiving to article discharge position, and means for releasing said latch as the article discharge arm swings on its discharge stroke.

4. A material handling device adapted for feeding articles to a machine comprising a reciprocating tray tiltable through a cycle from article receiving position to article discharge position and return, an arm pivoted on said tray and arranged to swing across said tray for discharging the article while the tray is in discharge position, a latch for holding the article on the tray, and cam actuated mechanism synchronized with said article discharge arm whereby as the arm swings through its article discharge stroke the cam actuated mechanism retracts said latch to release the article.

BART COTTER.
LEONARD H. KLAASEN.
THOMAS P. ARCHER.